United States Patent
Das et al.

(10) Patent No.: US 11,127,402 B2
(45) Date of Patent: Sep. 21, 2021

(54) SYSTEMS AND METHODS FOR VOICE DEVELOPMENT FRAMEWORKS

(71) Applicant: ServiceNow, Inc., Santa Clara, CA (US)

(72) Inventors: Santosh Kumar Das, Hyderabad (IN); Gagan deep, Hyderabad (IN); Sumit Rathi, Hyderabad (IN); Ashita Narayan, Hyderabad (IN); Chakradhar Narasimha Jillellamudi, Hyderbad (IN); Raghavan Muthuraman, Bengaluru (IN)

(73) Assignee: ServiceNow, Inc., Santa Clara, CA (US)

( * ) Notice: Subject to any disclaimer, the term of this patent is extended or adjusted under 35 U.S.C. 154(b) by 283 days.

(21) Appl. No.: 16/402,888

(22) Filed: May 3, 2019

(65) Prior Publication Data
US 2020/0349951 A1 Nov. 5, 2020

(51) Int. Cl.
*G10L 15/26* (2006.01)
*G06F 21/32* (2013.01)
*H04L 29/08* (2006.01)

(52) U.S. Cl.
CPC ............. *G10L 15/26* (2013.01); *G06F 21/32* (2013.01); *H04L 67/10* (2013.01)

(58) Field of Classification Search
CPC ......... G10L 15/26; G10L 15/08; G10L 15/28; G10L 2015/223; G10L 15/22; G06F 21/32; G06F 9/46; G06F 9/45512; G06F 9/455; G06F 8/38; G06F 16/95; H04L 67/10; H04L 29/08; H04L 67/02
See application file for complete search history.

(56) References Cited

U.S. PATENT DOCUMENTS

| | | | |
|---|---|---|---|
| 6,678,887 B1 | 1/2004 | Hallman | |
| 8,224,683 B2 | 7/2012 | Manos | |
| 8,983,982 B2 | 3/2015 | Rangarajan | |
| 9,508,051 B2 | 11/2016 | Falk | |
| 9,535,674 B2 | 1/2017 | Cooper | |
| 9,557,969 B2 | 1/2017 | Sharma | |
| 9,792,387 B2 | 10/2017 | George | |
| 10,277,743 B1* | 4/2019 | Agarwal | G10L 15/1815 |
| 2005/0234727 A1* | 10/2005 | Chiu | H04M 3/4936 704/270.1 |
| 2011/0321008 A1* | 12/2011 | Jhoney | G06F 9/451 717/114 |
| 2012/0121108 A1* | 5/2012 | Doubleday | H03G 3/20 381/110 |
| 2020/0395095 A1* | 12/2020 | Glusman | G06N 3/123 |

* cited by examiner

*Primary Examiner* — Huyen X Vo
(74) *Attorney, Agent, or Firm* — Fletcher Yoder PC (57) ABSTRACT

The present disclosure relates generally to a system and method for voice development frameworks. Certain cloud-based systems may be embodied in a multi-instance or multi-tenant framework, and may provide for certain computing systems and resources. For example, the cloud-based systems may provide for data repositories and the creation of executable objects, e.g., Flow Designer objects that include voice commands. In certain embodiments, visual development tools, including a Flow Designer system, may be used to create the executable objects, including voice command objects. For example, the Flow Designer system may enable the non-technical personnel to use natural language to more easily create and visualize objects and processes that automate certain tasks.

19 Claims, 10 Drawing Sheets

SYSTEMS AND METHODS FOR VOICE DEVELOPMENT FRAMEWORKS

BACKGROUND

The present disclosure relates generally to a system and method for voice development frameworks.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to a system and method for voice development frameworks. Certain cloud-based systems may be embodied in a multi-instance or multi-tenant framework, and may provide for certain computing systems and resources. For example, the cloud-based systems may provide for data repositories and the creation of executable objects, e.g., Flow Designer objects that include voice commands. In certain embodiments, visual development tools, including a Flow Designer system, may be used to create the executable objects, including voice command objects. The Flow Designer system may be used by non-technical personnel, among others, to develop code. For example, the Flow Designer system may enable the non-technical personnel to use natural language to more easily create and visualize objects and processes that automate certain tasks. For example, objects may be created without typing or otherwise entering text in a programming language. Once the objects and/or flows are created, the objects and/or flows may be provided for use by other entities and users of the Flow Designer system to provide for processes that include voice commands, voice questions, voice input, voice output, and so on.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The present disclosure relates generally to a system and method for voice development frameworks. Certain cloud-based systems may be embodied in a multi-instance or multi-tenant framework, and may provide for certain computing systems and resources. For example, the cloud-based systems may provide for data repositories and the creation of executable objects, e.g., Flow Designer objects that include voice commands. In certain embodiments, visual development tools, including a Flow Designer system, may be used to create the executable objects, including voice command objects. The Flow Designer system may be used by non-technical personnel, among others, to develop code. For example, the Flow Designer system may enable the non-technical personnel to use natural language to more easily create and visualize objects and processes that automate certain tasks. For example, objects may be created without typing or otherwise entering text in a programming language. Once the objects and/or flows are created, the objects and/or flows may be provided for use by other entities and users of the Flow Designer system to provide for processes that include voice commands, voice questions, voice input, voice output, and so on.

Figure 1:
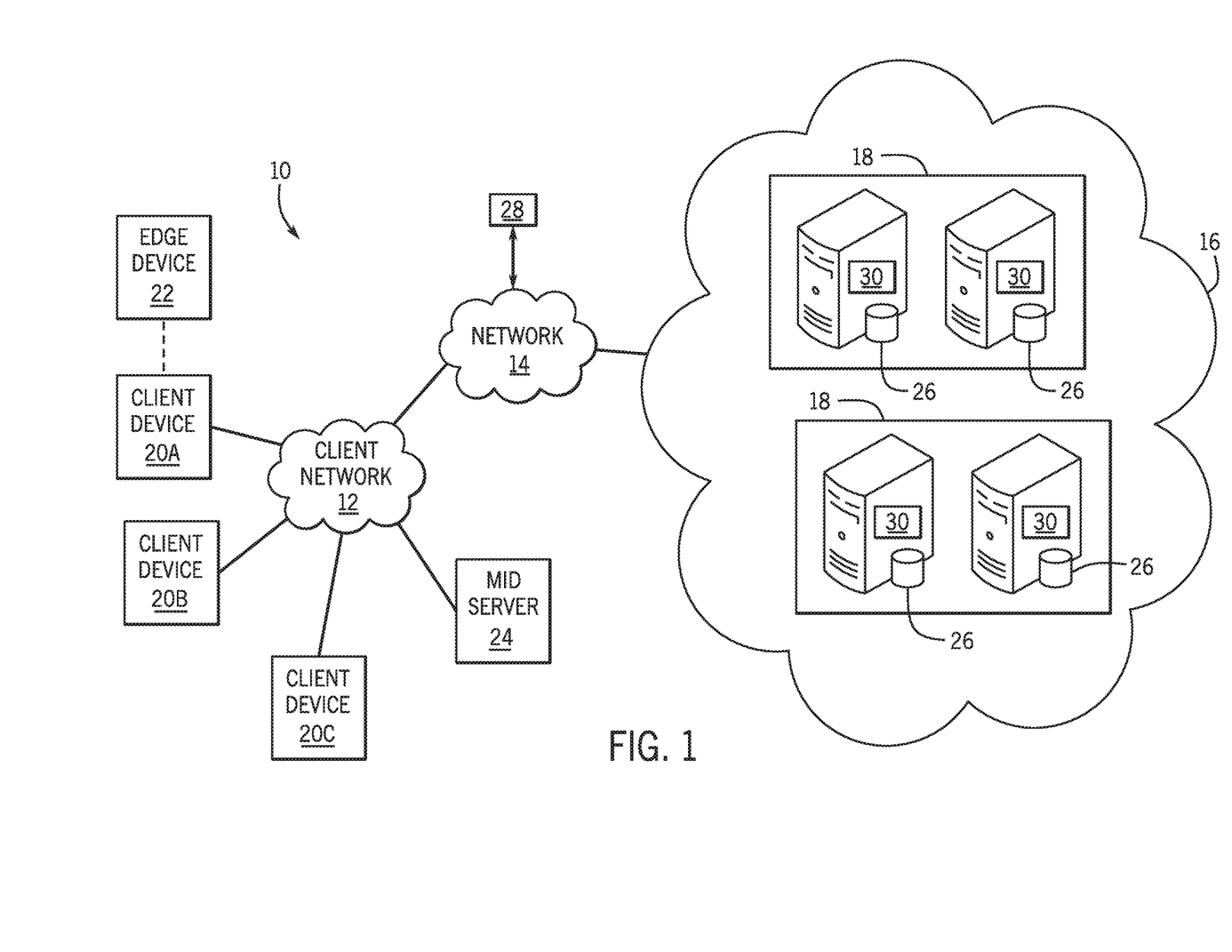
FIG. 1 is a block diagram of an embodiment of a cloud architecture in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM)

based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance.

It would be beneficial to enable voice input/output, for example, via the client devices 20, 22, with certain processes provided by the data centers 18 and/or the virtual servers 26. Accordingly, a voice services system 28 may be provided to be used in processes that provide for voice input, voice to text translations, text to voice translations, and so on. In one embodiment, the electronic signature system 28 may be an Alexa™ system available from Amazon.com, Inc., of Seattle, Wash., USA. The voice services system 38 may be communicatively and/or operatively coupled to a voice "spoke" or interface system 30. The voice spoke 30 may provide, for example, for integration of the voice services system 28 into certain systems executing in the servers 18, 26, and/or processing data from the servers 18, 26, such as Flow Designer systems, as further described below.

In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
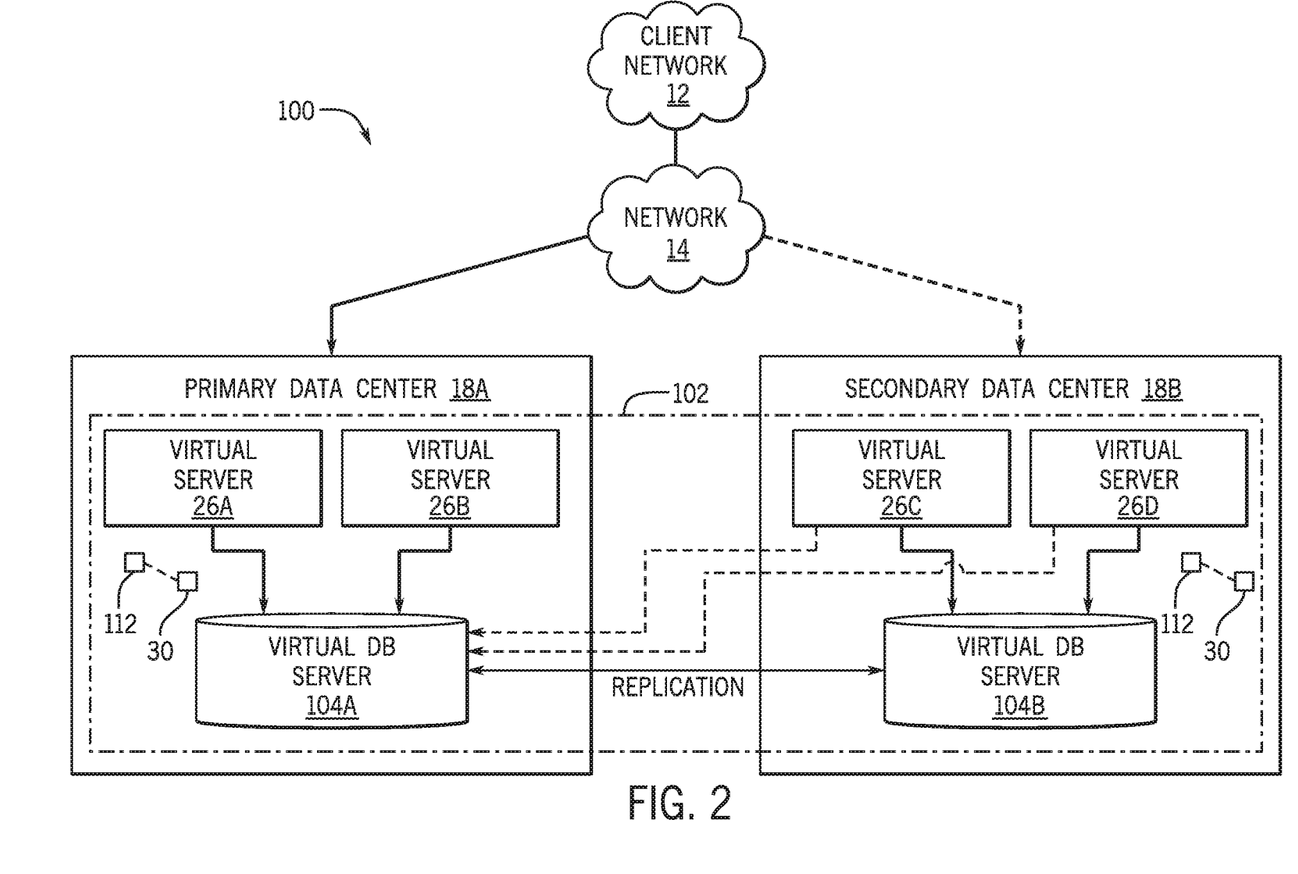
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

In the depicted embodiment, the voice spoke 30 may provide for voice interfacing with the voice services system 28. For example, the voice spoke 30 may enable flows created by a Flow Designer system 112, to operatively couple with the voice services system 28. The flows may then provide for voice commands, audio conversations, and so on, based on processes included in the flows. In the depicted example, the virtual servers 26 and/or the virtual database servers 104 include or are operatively coupled to the voice spoke 30 and to the Flow Designer system 112. Automation processes (e.g., flows) created by the Flow Designer system 112 as further described below may be created and/or used by a user authenticated to use the voice services system 28, the voice spoke 30, the virtual servers 26 and/or the virtual database servers 104. Further, software development activities, e.g., objects created via the Flow Designer system 112 may be created without resorting to typing in computer code.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
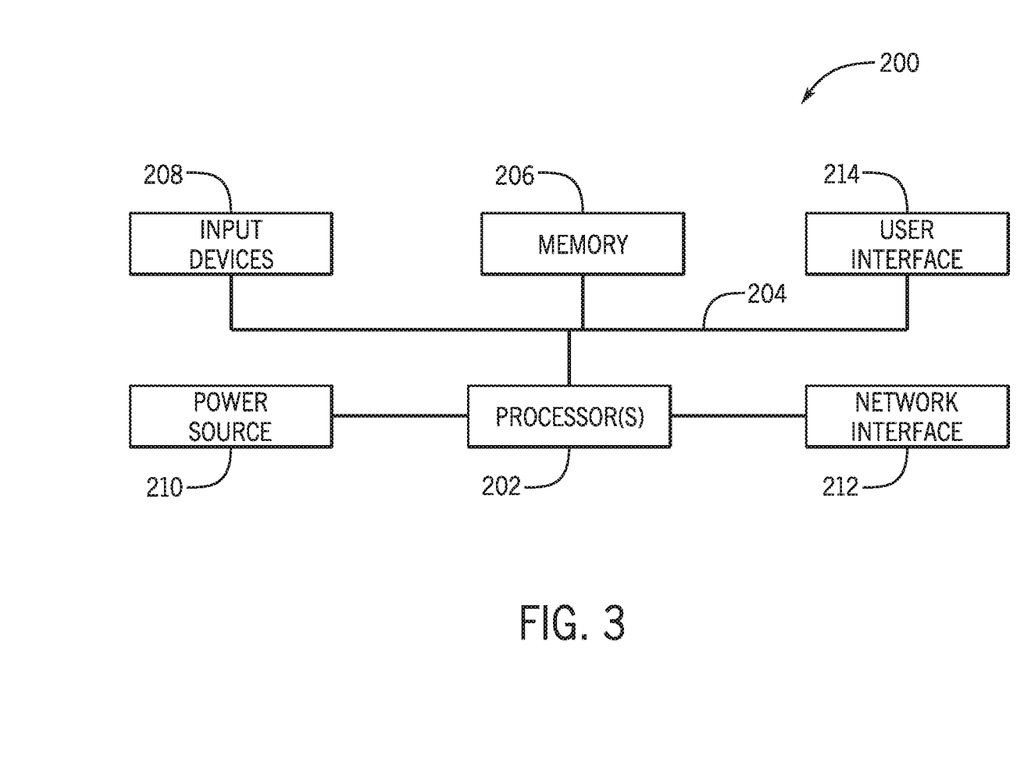
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
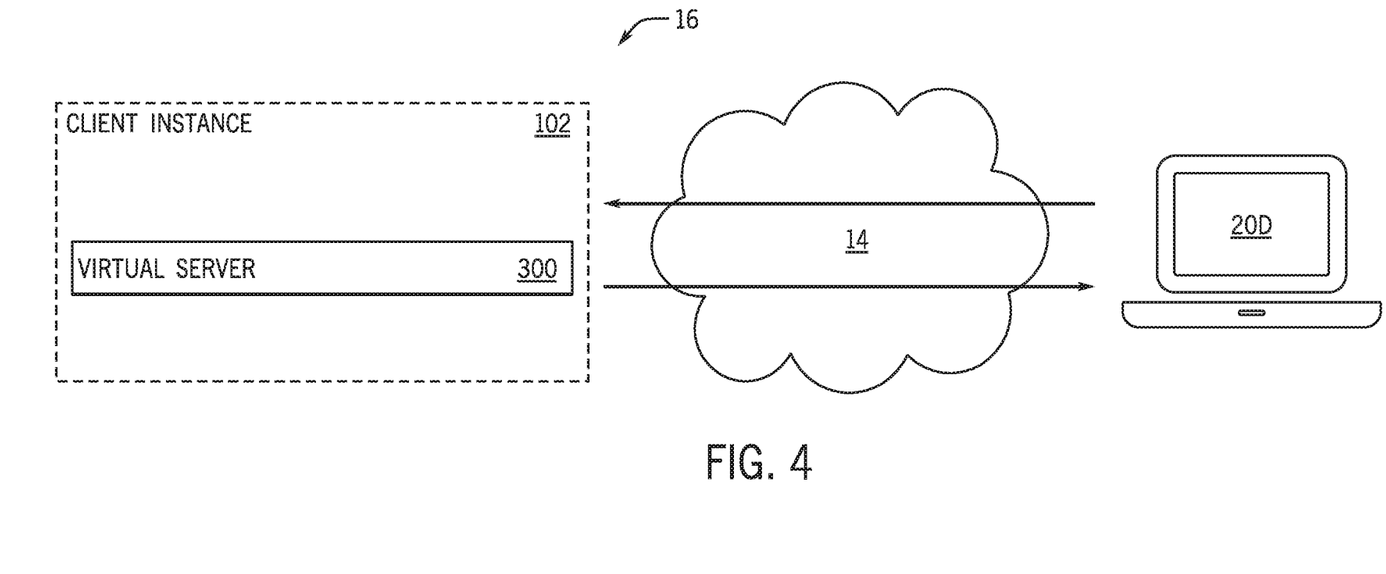
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

The present disclosure relates generally to a system and method for voice development frameworks. Certain cloud-based systems may be embodied in a multi-instance or multi-tenant framework, and may provide for certain computing systems and resources. For example, the cloud-based systems may provide for data repositories and the creation of executable objects, e.g., Flow Designer 112 objects that include voice input and/or output. In certain embodiments, visual development tools, including the Flow Designer system 112, may be used to create the executable objects, including voice input/output objects such as Flows, Subflows, Actions, Steps, and so on. The Flow Designer system 112 may be used by non-technical personnel, among others, to develop code. For example, the Flow Designer system 112 may enable the non-technical personnel to use visual techniques to more easily create and visualize objects and processes that automate certain tasks. For example, objects may be created without typing or otherwise entering text in a programming language. Once the objects and/or flows are created, the objects and/or flows may be provided for use by other entities and users of the Flow Designer system 112 to provide for processes that include voice commands, voice questions, voice input, voice output, and so on.

The voice framework techniques described herein may include the voice-enabled "spoke" interface 30 used to access cloud-based resources, such as the Flow Designer 112 objects. For example, certain information flows, such as human resource information flows, may benefit from processes that include voice inputs and outputs. Accordingly, the Flow Designer system 112 may interface with various development "spokes" to develop process flows and the voice-enabled "spoke" 30 to provide for voice-enabled services that interact with the process flows.

In certain embodiments, the voice-enabled "spoke" 30 may provide for interfaces to cloud services such as Amazon™ web services (AWS) lambda functions. The AWS™ lambda functions, may interpret voice input and their outputs (e.g., voice to text output) may be used to execute, for example, certain scripts, such as representational state transfer (REST) scripts. In certain embodiments, an Alexa™ endpoint may be used to provide for a voice services, e.g., as a "skill." The skill may use one or more AWS™ lambda functions (e.g., custom lambda functions). The lambda functions may in turn interact with scripted REST objects that may be included, for example, as part of an engine or a REST "spoke" that may be provided by ServiceNow™ Corporation of Santa Clara, Calif., United States, to in turn execute certain Flow Designer objects.

In one example, a user may speak a command, such as "Execute a Flow named 'create a user in the Active directory'" and the voice framework may then execute the desired Flow Designer 112 flow object, prompting, via voice prompts, the user for a user name, password, user role, and so on. Indeed, a variety of voice-only interactions may be provided, enabling more efficient use of time and streamlining certain processes, including human resource processes, business processes, information technology (IT) processes, and so on. Conversations may also be carried, for example, via chatbots and virtual assistants. User authentication may be provided, in one embodiment, by linking accounts. For example, an Alexa account may be linked to one or more accounts in other services, such as ServiceNow™ services. Access control lists (ACLs) may be used to provide authorization. For example, a REST endpoint may be created and bound to a REST script so that certain users may be authorized while other users may not.

The voice framework techniques may thus enable the creation and/or use of objects via voice so that the objects may support a variety of processes and information flows. The techniques described herein may further provide an integration hub that enables execution of the objects and/or services, for example, via voice interactions. Accordingly, the Flow Designer system 112 may collaborate with the integration hub to provide for a more efficient creation of an application, e.g., scoped application, on a development instance of a server to build Flow and Subflow objects that include voice inputs and/or voice responses. The Flow and Subflow objects may then be published in an application repository. The application may be published in various ways, such as publishing to production instances, to online application stores, and/or via sharing facilities.

Figure 5:
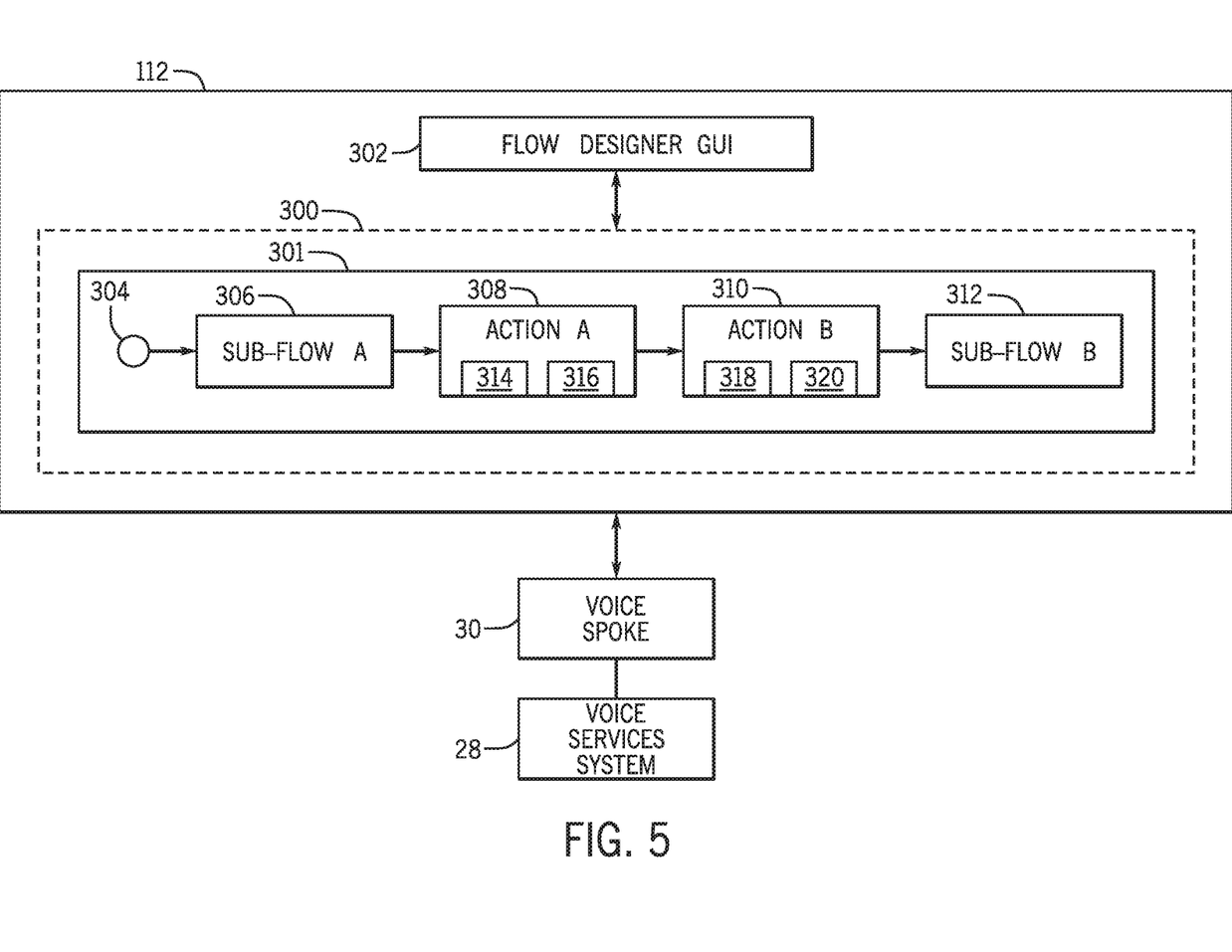
FIG. 5. is a block diagram illustrating an embodiment of a Flow Designer system suitable for creating information flow objects that may include voice input and/or voice output capabilities, in accordance with aspects of the present disclosure.

It may be beneficial to describe certain computing resources that may be used via the techniques described herein. Turning now to FIG. 5, the figure is a block diagram illustrating an embodiment of the Flow Designer system 112 suitable for creating information flow objects 300 that may include voice input and/or voice output capabilities. In the depicted example, the voice spoke 30 may provide voice processing in the Flow Designer system 112 via the voice services system 28. More specifically, the voice spoke 30 may interface with the voice services system 28 to provide for voice-to-text, text-to-voice, user authentication, and other voice services to the flow objects 300. During operations, a user of the flow objects 300 may thus interact via voice with the flow objects 300, thus enabling a more efficient voice-based interactions with the flow objects 300.

It is to be understood that the Flow Designer system 112 as depicted is an example only and may be included in or implemented using one or more of the virtual servers 26, the virtual DB servers 104, or a combination thereof. In the depicted embodiment, the Flow Designer system 112 includes a flow designer GUI 302, e.g., a visual information flow creation tool. The flow designer GUI 302 may provide for visual programming as opposed to entering text representative of a computer program. The flow designer GUI 302 may include executable code or computer instructions suitable for creating, managing, accessing, and/or editing the flow objects 300. In the depicted embodiment, a single flow 301 is shown in the flow objects 300. It is to be understood that more than one flow may be provided in the flow objects 300.

The flow 301 may include a trigger 304 which may be "fired" or otherwise turned on by certain changed condition, such as a change in one or more records stored in a database (e.g., stored in the virtual DB servers 104). The trigger 304 may additionally be "fired" periodically, for example, as part of a schedule (e.g., hourly schedule, daily schedule, weekly schedule, monthly schedule, and so on). The trigger 304 may thus be used to initiate execution of other flow objects 300, such as sub-flow 306, Action 308, Action 310, and sub-flow 312.

In the depicted embodiment, the trigger 304 initiates execution of the sub-flow 306. The sub-flow 306 may include Actions, control logic (e.g., Boolean logic, branching logic, termination logic), other sub-flows, and so on. The sub-flow 306 may additionally take in inputs and provide outputs. For example, output of the sub-flow 306 may be used as input to the Action 308. The Action 308 may use the inputs provided to execute Steps 314, 316. The Action 308 may also include control logic. Steps, such as the Steps 314, 316, and may be self-contained code, such as scripts (e.g., Java, JavaScript code) provided by the manufacturer of the flow designer system 112. As an example, the Flow Designer system 112 may be provided by ServiceNow™ Inc., of Santa Clara, Calif., U.S.A., under the name Flow Designer™. The Steps 314, 316 may be additionally or alternatively provided by other third parties and/or coded by certain users, such as IT users.

Steps may include any number of functionality, such as requesting approval from other users of the servers 26, 104, creating records in a database table, editing the record in the database table, deleting the records in the database table, creating server tasks, logging messages, looking up database information, notifying of certain events (e.g., incidents, change requests, problems, changes to user records), executing scripts, such as JavaScript, sending email, waiting for a condition to occur, and so on. Action 310 may execute following Action 308. In turn, Action 310 may include Steps 318, 320, and upon completion of Step 320, sub-flow 312 may be executed. Once sub-flow 312 finishes execution, the flow 301 finishes. Flows, such as the flow 301, may not have outputs. The flows may be executable from external clients, such as a client coupled to the client network 12 shown in FIG. 1.

Figure 6:
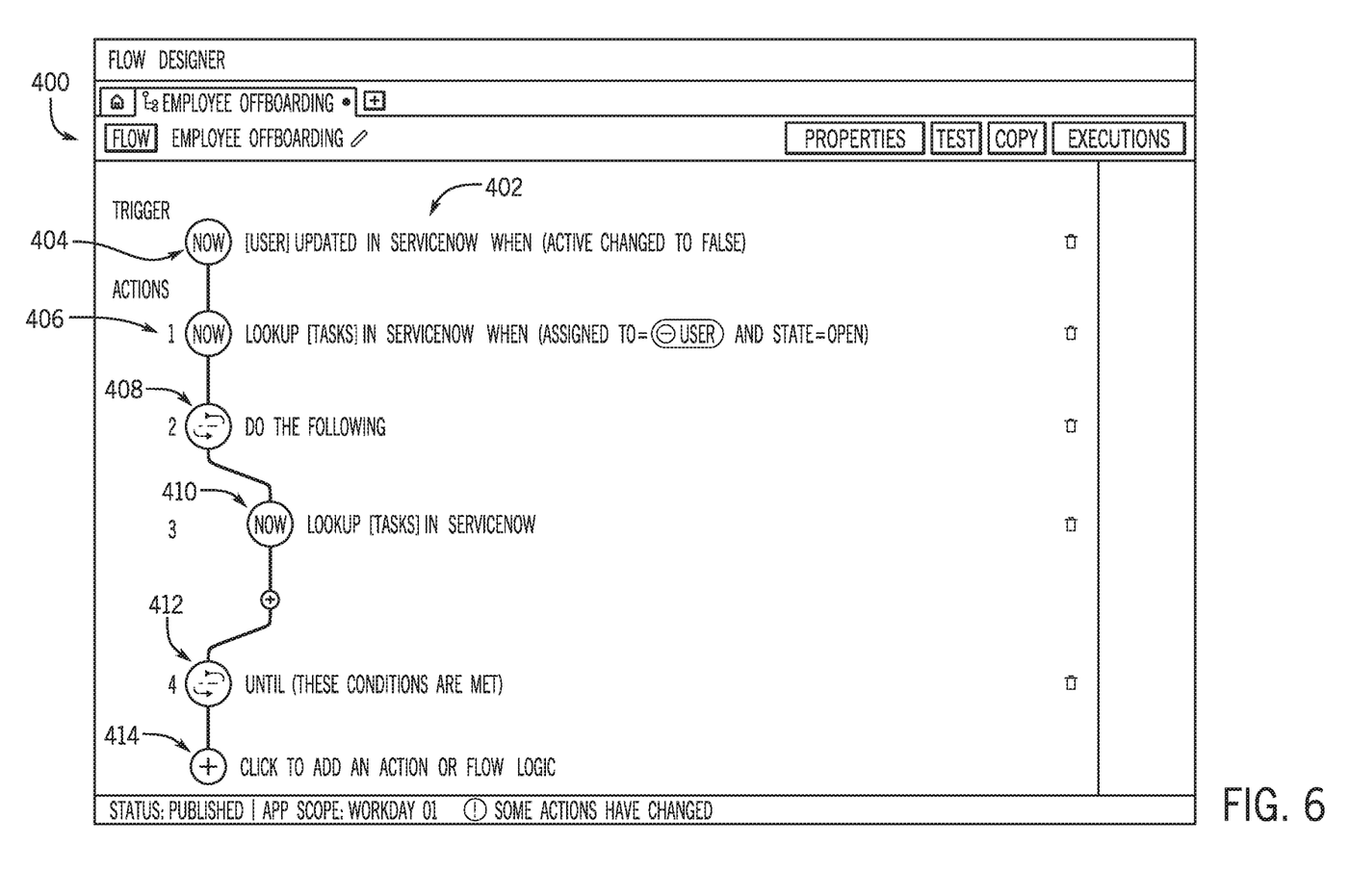
FIG. 6 is a screenshot depicting an embodiment of a graphical user interface (GUI) suitable for inputting certain flow objects into a flow, in accordance with aspects of the present disclosure.

FIG. 6 is a screenshot depicting an embodiment of a graphical user interface (GUI) 400 suitable for inputting certain flow objects 300 into a flow, such as the flow 301. The GUI 400 may be accessible once the user is authenticated via an authentication system and used to create the flow 301 via the Flow Designer system 112. In the depicted embodiment, a graphical flow view 402 of a flow is shown. Indeed, the GUI 400 may be used to create and edit any number of graphical flow views that may then be executed as flow objects 300.

In the depicted embodiment, the graphical flow view 402 may start execution via a trigger 404. More specifically, if a certain user record is updated, then the trigger 404 may "fire" and execute Action 406. The Action 406 may then retrieve a set of tasks assigned to the updated user that have an open state. The retrieved tasks may then be further process via a "Do . . . Until" control logic. More specifically, a Do logic 408 may execute one or more Actions, such as Action 410, until the "Until" control logic 410 has its conditions met. More sub-flows and/or Actions may be added, for example, via the "+" control 414. As shown, visual composition via the flow designer 302 may be used to enable the creation of executable flow objects 300. The flow objects 300 may then be reused by clients connected to the network 12.

Figure 7:
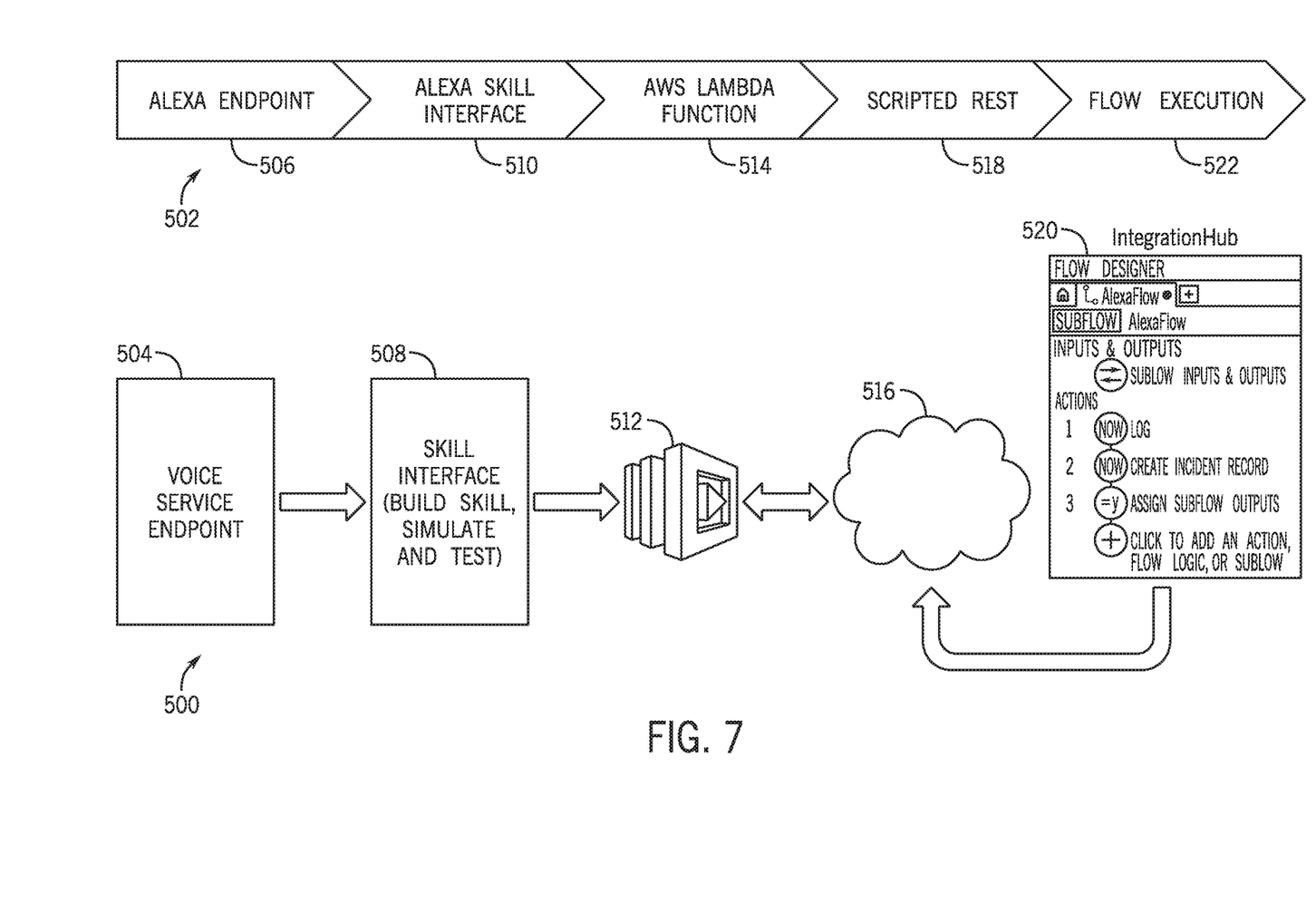
FIG. 7 is a block diagram showing embodiments of certain voice subsystems and a corresponding example implementation for integration hub end use, in accordance with aspects of the present disclosure.

Turning now to FIG. 7, the figure is a block diagram showing embodiments of certain voice subsystems 500 and a corresponding example implementation 502 suitable for implementing the techniques described herein. In the depicted embodiment, voice service endpoint 504 may provide for one or more "skills" suitable for enabling voice input/output. For example, the voice service endpoint 504 may be serviced by the voice services system 28 as a cloud-based system accessible via JavaScript Object Notation (JSON) requests and responses. In one example, the voice service endpoint may be an Alexa endpoint 506 (e.g., hardware endpoint such as an Alexa™ Echo device, software endpoint such as a virtual Echo device), providing for the use of custom voice skills.

An interface 508, e.g., skill interface, may be used to build, simulate, and/or test one or more voice services. For example, the interface 508 may provide for a variety of objects, classes, functions, modules, and so on, that may be used to create a custom voice-based skill. In the depicted embodiment, the interface 508 may be an Alexa™ skill interface 510 that provides for the building, simulating, testing, and/or deployment of Alexa™ skills.

The skill interface 508 may interact with and/or result in the execution of one or more serverless computing resources 512, which in the depicted embodiment may be Amazon Web Services (AWS) lambda functions 514. The resources 512 may provide for cloud-based serverless interaction with the custom skill 508. For example, certain scripts 516, such as scripted REST objects 518 may be used and/or created by the Flow designer system 112 to execute Integration Hub 520 Flow objects, such as the objects 300 created via the GUI 400. The Flow objects 300 may repeatedly interact with the scripts 516 to enable voice input/output.

In a skill invocation example, skill intents and slots may be used. The slots may enable the scripts 516 to be able to consume dynamic parameters and take different execution paths. A skill service built via the interface 508 may make a call to a backend resource 512 (e.g., AWS lambda function 514). The lambda function 514 may be based on node.js and depends on the following node modules: 1. Request, 2. Amazon Alexa™ skill development kit (ASD module), and 3. JSON parsing module for request and response parsing. The AWS lambda function 514 may take dynamic parameters and pass the dynamic parameters to the scripts 516 (e.g., REST scripts 518). The AWS lambda function 514 may also pass certain headers to the skill built via the skill interface 508 for user authentication. The Integration Hub 520 may provide for Flow execution. For example, the scripts 516 may use a ServiceNow Flow API to execute the Integration Hub's 520 Flow object.

Likewise the skill built via the skill interface 508 may be used to also invoke Subflows and Action APIs as well. The Flow, Subflow and/or Action API may be executed synchronously and/or asynchronously depending on business requirements. The Flow, Subflow and/or Action APIs may execute and return results which are then transformed into a JSON format compatible with Alexa™ and the results may then be sent to the skill service, which in turn returns speech output to the endpoint 504 (e.g., Alexa™ Echo Dot or Echo devices.

The techniques described herein may provide for a variety of uses. For example, a user may execute an incident response skill by speaking the words "Computer, assign the incident which has highest priority to 'Fast Response Group'." A Flow may then be initiated that queries a list of users in the 'Fast Response Group' and then assigns the users an incident or incidents which include 'high priority'. A user may also speak the words "Computer, show all of my assigned incidents sorted by priority" to see a list, ordered by priority, of incidents to be worked on. Similar use case examples may be provided for human resource skills, software development skills, sales skills, document management skills and so on.

Figure 8:
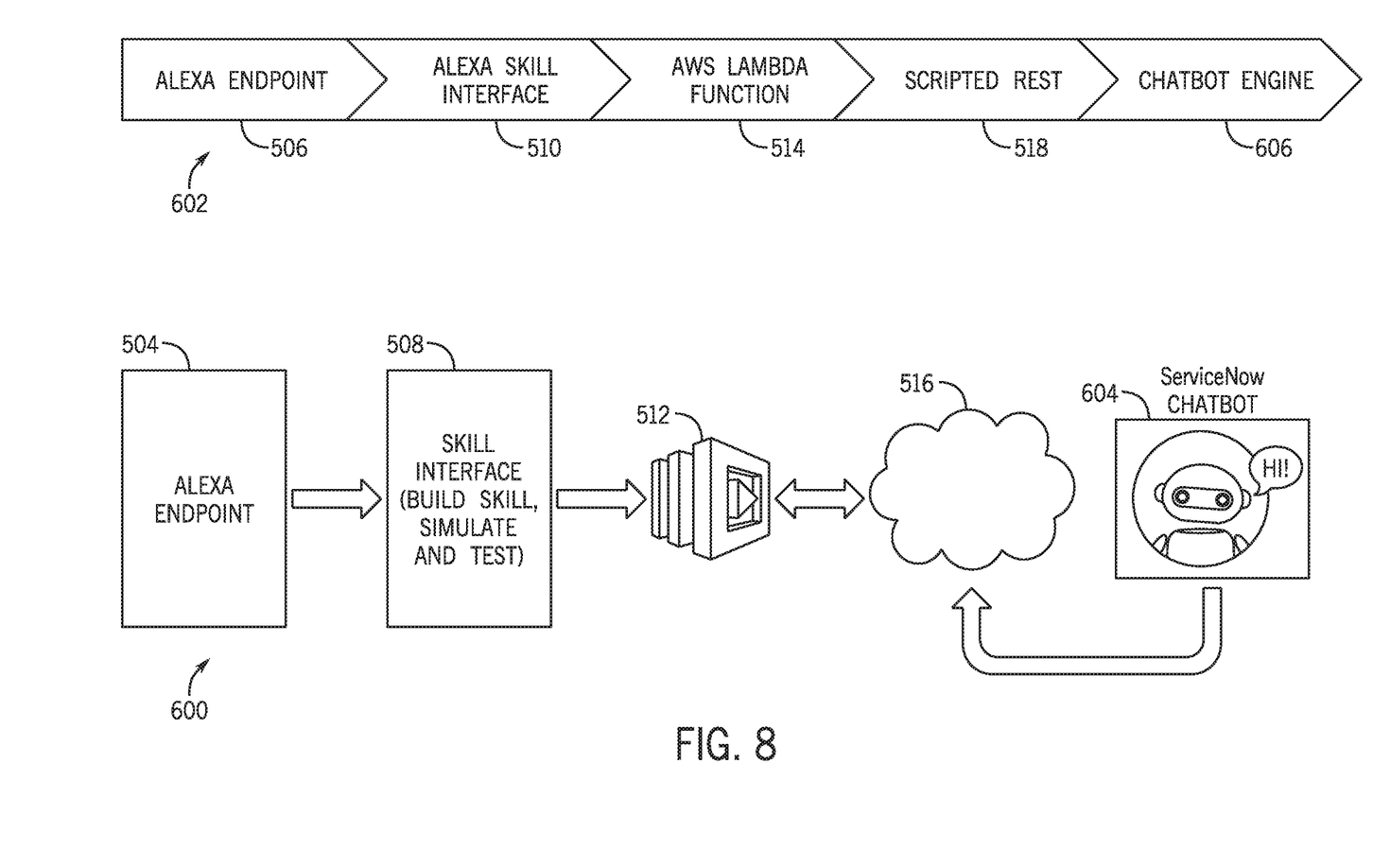
FIG. 8 is a block diagram showing embodiments of certain voice subsystems and a corresponding example implementation for chatbot end use, in accordance with aspects of the present disclosure.

The techniques described herein may also include voice interaction, for example, with virtual assistants such as chatbots, as shown in FIG. 8. More specifically, the figure is a block diagram showing embodiments of certain voice subsystems 600 and a corresponding example implementation 602 suitable for implementing the techniques described herein. Because the figure uses elements from FIG. 7, the elements use the same element numbers.

In the depicted embodiment, the voice service endpoint 504 may provide for one or more "skills" suitable for enabling voice input/output. For example, the voice service endpoint 504 may be serviced by the voice services system 28 as a cloud-based system accessible via JavaScript Object Notation (JSON) requests and responses. In the depicted example, the voice service endpoint may be an Alexa endpoint 506 (e.g., hardware endpoint such as an Alexa™ Echo device, software endpoint such as a virtual Echo device), providing for the use of custom voice skills.

The interface 508 may be used to build, simulate, and/or test one or more voice services. For example, the interface 508 may provide for a variety of objects, classes, functions, modules, and so on, that may be used to create a custom voice-based skill. In the depicted embodiment, the interface 508 may be an Alexa™ skill interface 510 that provides for the building, simulating, testing, and/or deployment of Alexa™ skills.

The skill interface 508 may interact with and/or result in the execution of one or more serverless computing resources 512, which in the depicted embodiment may be Amazon Web Services (AWS) lambda functions 514. The resources 512 may provide for cloud-based serverless interaction with the custom skill 508. For example, certain scripts 516, such as scripted REST objects 518 may be used and/or created by the Flow designer system 112 to interact with a Service Now chatbot 604 (e.g., a chatbot engine 606). The chatbot 604 may provide for "rich" conversations. That is, during a conversation, previous interactions between a user and the chatbot 604 may be used to provide for context and for background relevant to new interactions. For example, a user may ask the chatbot 604 during a help session "how do I create a new user?" The chatbot 604 may respond by answering "you can say 'create new user'." The user may then ask "does that work for multiple users?" and the chatbot 604 may then respond "yes, you just have to say 'create new users'."

As shown in the FIGS. 7 and 8, the systems 504, 508, 512, and 516 (e.g., implemented as systems 506, 510, 514, and 518) may interact as a voice development framework suitable for handing a variety of end uses (e.g., chatbot 604, Integration Hub 520). Indeed, skills may be built to target a variety of uses and scripts 516 (e.g., REST scripts) may be used to enable a back-end interface with the skills. Yet another example of the framework being used to target a document management system is shown in FIG. 9.

Figure 9:
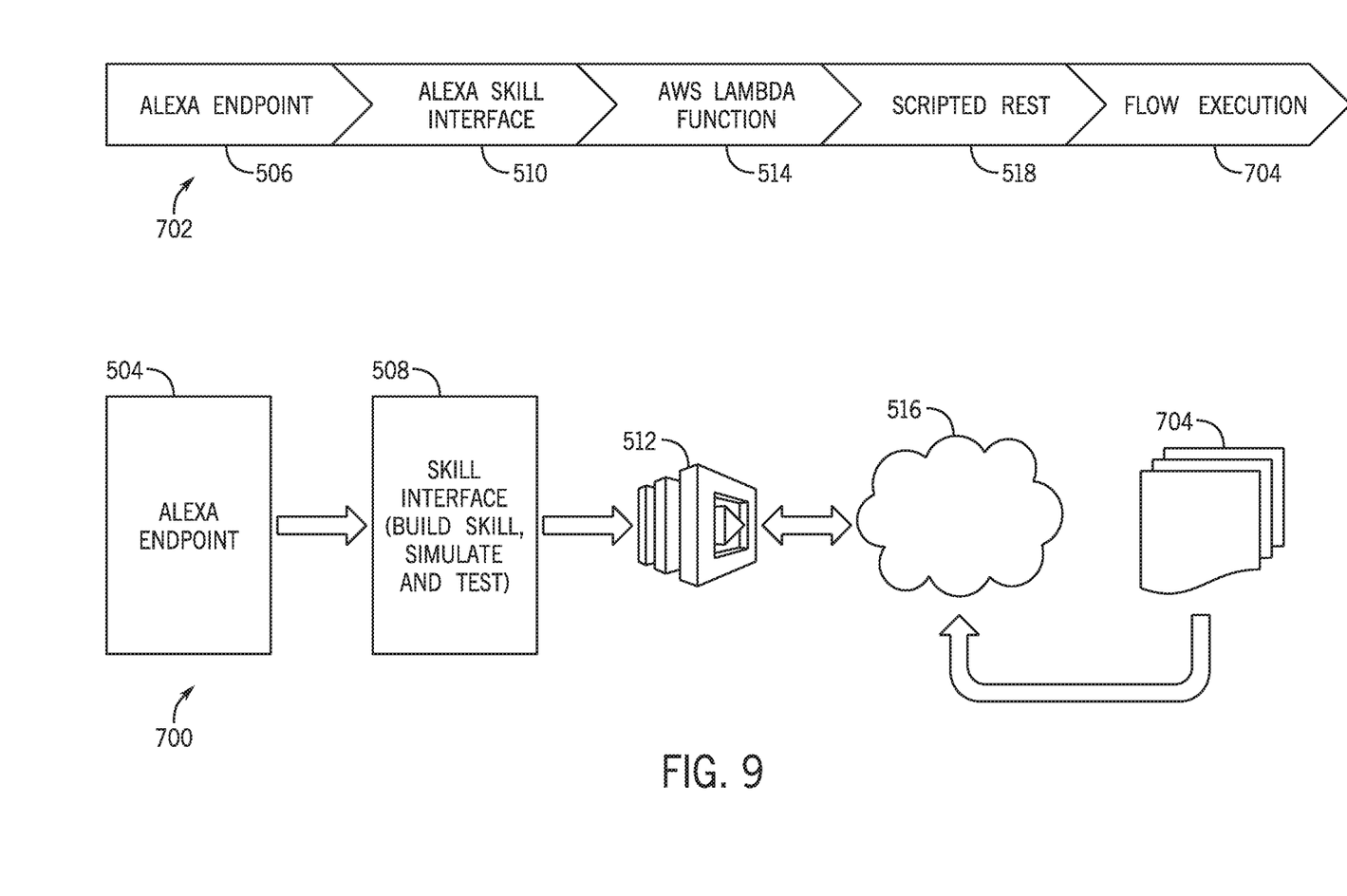
FIG. 9 is a block diagram showing embodiments of certain voice subsystems and a corresponding example implementation for document management system end use, in accordance with aspects of the present disclosure.

More specifically, FIG. 9 figure is a block diagram showing embodiments of certain voice subsystems 700 and a corresponding example implementation 702 suitable for implementing the techniques described herein. Because the figure uses elements from FIGS. 7 and 8, the elements use the same element numbers.

In the depicted embodiment, the voice service endpoint 504 may provide for one or more "skills" suitable for enabling voice input/output. For example, the voice service endpoint 504 may be serviced by the voice services system 28 as a cloud-based system accessible via JavaScript Object Notation (JSON) requests and responses. In the depicted example, the voice service endpoint may be an Alexa endpoint 506 (e.g., hardware endpoint such as an Alexa™ Echo device, software endpoint such as a virtual Echo device), providing for the use of custom voice skills.

The interface 508 may be used to build, simulate, and/or test one or more voice services. For example, the interface 508 may provide for a variety of objects, classes, functions, modules, and so on, that may be used to create a custom voice-based skill. In the depicted embodiment, the interface 508 may be an Alexa™ skill interface 510 that provides for the building, simulating, testing, and/or deployment of Alexa™ skills.

The skill interface 508 may interact with and/or result in the execution of one or more serverless computing resources 512, which in the depicted embodiment may be Amazon Web Services (AWS) lambda functions 514. The resources 512 may provide for cloud-based serverless interaction with the custom skill 508. For example, certain scripts 516, such as scripted REST objects 518 may be used and/or created by the Flow designer system 112 to interact with a document management system 704. The document management system 704 may provide for storage management, sharing, collaboration, retrieval, and associated operations of online documents. In one embodiment, the document management system 704 may be a Box™ system available from Box, Inc., of Redwood City, Calif., USA.

As mentioned above, a voice development framework may include the systems 504, 508, 512, and 516 (e.g., implemented as systems 506, 510, 514, and 518) suitable for providing interfaces to a variety of end use systems, such as the document management system 704. A developer may create a custom skill via the skill interface 508 that targets certain voice interactions (e.g., phrases to use to perform certain tasks, responses to certain tasks, voice commands, voice results, and so on) and the framework may then automatically create functions 512 and scripts 516 suitable for interfacing with the desired end use system (e.g., systems 520, 604, 704). The framework may then be used to deliver the custom skill and resulting functions 512 and scripts 516 so that an end user may use voice to interact with the desired end use system.

Accordingly the framework may include the ability to programmatically author and provision the skills via certain systems (e.g., systems such as Flow Designer 112, Integration Hub 520), as well as the ability to automatically provision Scripted REST APIs 518 and AWS lambda functions 514. The framework may also provide the ability to use voice service systems, including Alexa™ endpoints, to interact with other systems, e.g., Integration Hub 520. The framework may additionally provide for the ability to use Alexa™ to execute Flow objects 300 and receive speech response based on the results returned as part of Flow object execution (e.g., execution of Flows, Subflows, Actions, and/or Steps).

Figure 10:
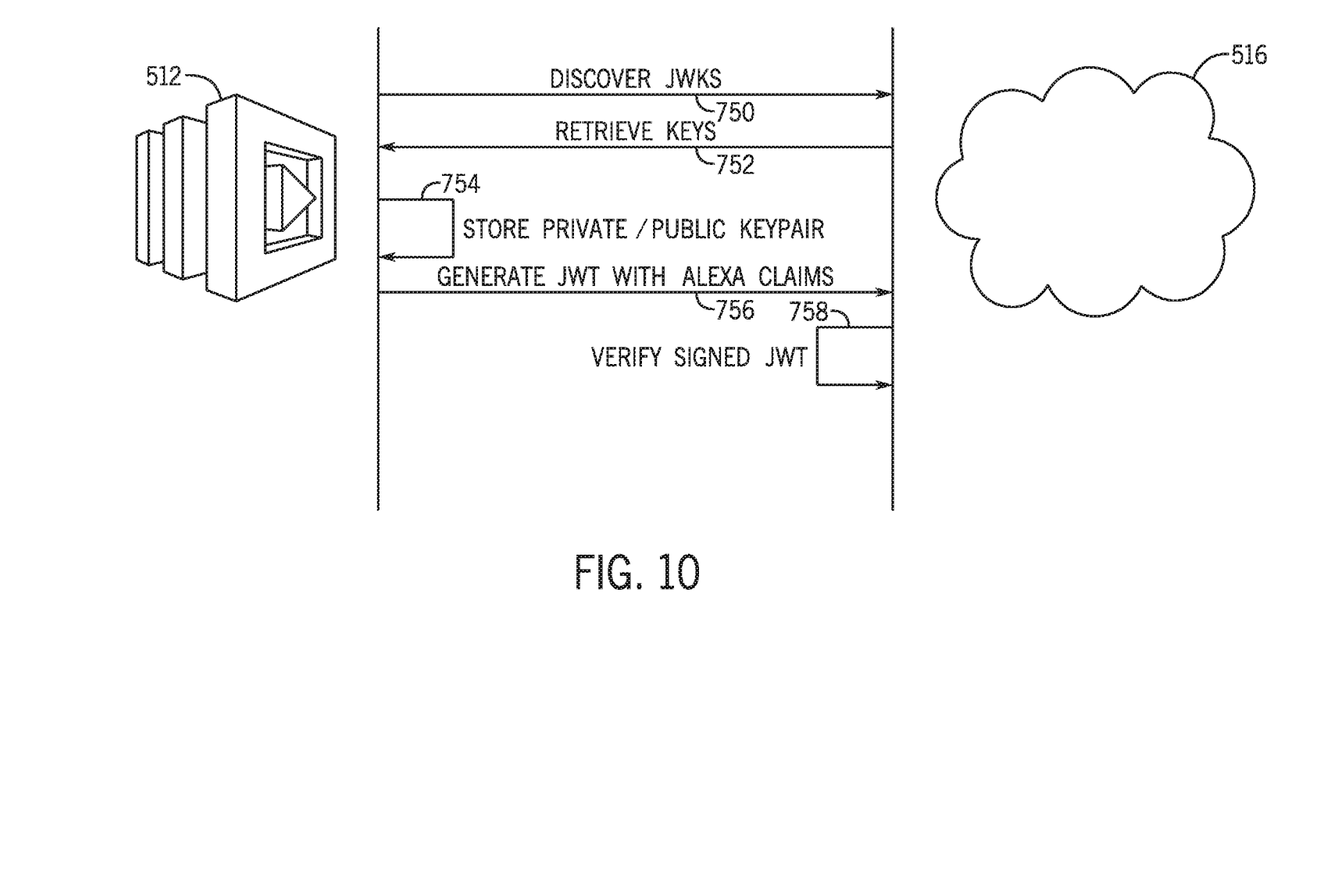
FIG. 10 is an interaction diagram illustrating the use of security processes for more secure interactions between the functions and the scripts, in accordance with aspects of the present disclosure.

In certain embodiments, as illustrated in FIG. 10, the techniques described herein may provide for security via JSON web token (JWT), for example, for accounting liking. More specifically, FIG. 10 is an interaction diagram illustrating the use of JWT access tokens for more secure interactions between the functions 512 and the scripts 516. As illustrated, a JSON web key set (JWKS) discovery process 750 may be used to retrieve (process 752) one or more keys to be used during authentication. The one or more keys may include public keys being provided by the scripts 516, as well as private keys generated by the functions 512, for example, during linking of a function 512 account with a script 516 account. The functions 512 may then store (process 754) the public and private keys.

The functions 512 may then generate (process 756) a signed JWT (e.g., signed via a public/private keys) to authenticate, for example a voice service (e.g., Alexa™) communication. The scripts 516 may then receive the signed JWT and use the signed JWT to authenticate communications from the functions 512. Accordingly, communications between the functions 512 and the scripts 516 may be authenticated.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
a server communicatively coupled to a data repository and configured to store a data in the data repository, wherein the server is configured to perform operations comprising:
creating, via a visual information flow creation tool, at least one information flow object;
creating, via a voice skill interface, a first voice skill;
creating a first script configured to interface the first voice skill to the at least one information flow object; and
linking a first account authenticating a voice service endpoint to a second account authenticating the first script.

2. The computing system of claim 1, wherein the visual information flow creation tool is configured to create the at least one information flow object in lieu of entering text for a computer program when creating the at least one information flow object.

3. The computing system of claim 1, wherein the first voice skill is configured to translate a speech into a text.

4. The computing system of claim 1, wherein the server is configured to perform operations comprising creating one or more functions configured to interface between the first voice skill and the first script.

5. The computing system of claim 4, wherein the one or more functions comprise one or more Amazon Web Services (AWS) lambda functions.

6. The computing system of claim 1, wherein the first script comprises a representational state transfer (REST) script.

7. The computing system of claim 1, wherein the server is configured to perform operations comprising creating, via the voice skill interface, a second voice skill; and creating a second script configured to interface the second voice skill to a virtual assistant.

8. The computing system of claim 7, wherein the virtual assistant comprises a chatbot configured to provide for a rich conversation.

9. The computing system of claim 1, wherein the server is configured to perform operations comprising creating, via the voice skill interface, a third voice skill; and creating a third script configured to interface the third voice skill to a document management system.

10. The computing system of claim 1, wherein the first voice skill is configured to use the voice service endpoint to receive speech from a user of the first voice skill.

11. A method, comprising:
creating, via a visual information flow creation tool, at least one information flow object;
creating, via a voice skill interface, a first voice skill;
creating a first script configured to interface the first voice skill to the at least one information flow object; and
linking a first account authenticating a voice service endpoint to a second account authenticating the first script.

12. The method of claim 11, wherein creating, via the visual information flow creation tool, the at least one information flow object comprises creating the at least one information flow object in lieu of entering text for a computer program.

13. The method of claim 11, comprising creating one or more Amazon Web Services (AWS) lambda functions configured to interface between the first voice skill and the first script.

14. The method of claim 11, comprising creating, via the voice skill interface, a second voice skill; and creating a second script configured to interface the second voice skill to a virtual assistant.

15. The method of claim 11, comprising creating, via the voice skill interface, a third voice skill; and creating a third script configured to interface the third voice skill to a document management system.

16. The method of claim 11, wherein the first voice skill is configured to use the voice service endpoint to receive speech from a user of the first voice skill.

17. A non-transitory, computer-readable medium storing instructions executable by a processor of a computing system, the instructions configured to:
create, via a visual information flow creation tool, at least one information flow object;
create, via a voice skill interface, a first voice skill;
create a first script configured to interface the first voice skill to the at least one information flow object; and
link a first account authenticating a voice service endpoint to a second account authenticating the first script, wherein the first voice skill is configured to use the voice service endpoint to receive speech from a user of the first voice skill.

18. The computer-readable medium of claim 17, wherein the instructions are configured to create, via the voice skill interface, a second voice skill; and to create a second script configured to interface the second voice skill to a virtual assistant.

19. The computer-readable medium of claim 17, wherein the instructions are configured to create, via the voice skill interface, a third voice skill; and to create a third script configured to interface the third voice skill to a document management system.

* * * * *